UNITED STATES PATENT OFFICE.

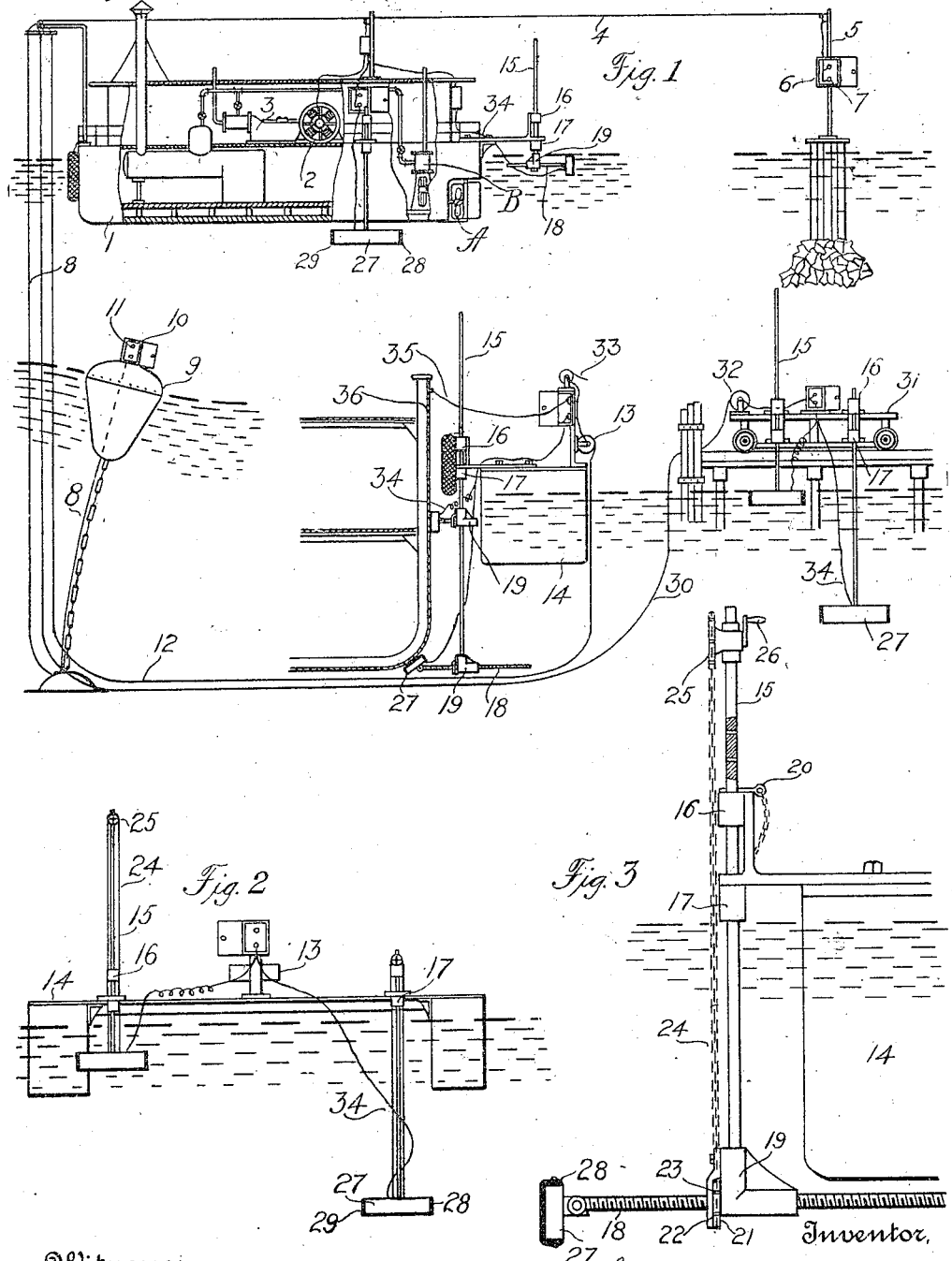

GEORGE W. FRAZIER, OF PITTSBURG, PENNSYLVANIA; MARY E. FRAZIER, ADMINISTRATRIX OF SAID GEORGE W. FRAZIER, DECEASED, ASSIGNOR TO PITTSBURGH ELECTROLYTIC MFG. CO., A CORPORATION OF PENNSYLVANIA.

ELECTROLYTIC SHIP-CLEANER.

981,922.

Specification of Letters Patent. Patented Jan. 17, 1911.

Application filed November 28, 1908, Serial No. 464,835. Renewed June 6, 1910. Serial No. 565,379.

To all whom it may concern:

Be it known that I, GEORGE W. FRAZIER, a citizen of the United States, residing at Pittsburg, in the county of Allegheny and State of Pennsylvania, have invented certain new and useful Improvements in Electrolytic Ship-Cleaners, of which the following is a specification.

This invention relates to electrolytic ship cleaners, and has, generally considered, the same nature and purpose as the apparatus and the inventions described and set forth in Letters Patent of the United States issued to me May 8, 1906, No. 820,105, and No. 872,759, December 3, 1907, of the United States issued to John H. Schoneberger and to me as joint inventors, and, also, in the application for Letters Patent of the United States filed by John H. Schoneberger and myself as joint inventors July 10, 1907, Serial No. 383,021. In those inventions the electrode or electrodes and the source of current electricity are borne by each vessel as a part of its regular equipment, and the devices illustrated and explained are adapted for cleansing the exterior plates or interior pipes and receptacles of that vessel only by which they are carried.

It is an object of my present invention to provide means and contrivances suitable in number, bodily movable and having adjustable mechanical parts whereby the electrodes may be applied to one or to a number of vessels at the same time, the current being received from a central generating station at the shore or carried by a self-propelled floating body. The floating central station may be itself furnished with a plurality of adjustable electrodes supports, in order that it may proceed to the side of any given ship at anchor, for the purpose of cleansing that ship exteriorly or interiorly, while, at the same time, current may be supplied to other floating and non-floating electrodes supports that may be acting upon other vessels in the vicinity. As fully explained in the patents and application referred to above, the cleansing action results from the electrolytic operation of the current upon the sea water between the electrode as one pole and the plates of the ship as the other pole, and the creation of a film of caustic soda immediately at the surface of the ship's plates, the electrode and the plates being separated by a relatively small distance.

The stated objects of my present invention are attained by fashioning and associating the various devices as illustrated in the accompanying drawings, of which—

Figure 1 represents a diagrammatic plan view of the arrangement of the central station and sub-stations of my invention. Fig. 2 is a front view of a float provided with more than a single electrode and adjustable support for applying it to a vessel. Fig. 3 represents a side view of an electrode support and shows the adjusting devices and related parts. In Fig. 3, the scale of drawing has been increased to more clearly exhibit the construction of the parts.

Like numbers are used to refer to the same parts throughout the description and drawings.

The main or central station float 1, may possess its own propeller A and engine B therefor, or, it may be towed from place to place as desired. When tied up at any location it obviously takes the place of an equivalent generating plant on shore in the same situation. The float 1 is provided with an electrical generator 2 and an operating engine 3. From the central float 1 and the generator a conducting cable 4 may be suspended overhead and lead to a post 5 suitably supported above the surface of the water and provided with a terminal box 6 and connecting devices 7. Another conducting cable 8 may lead beneath the water from the float 1 to a buoy 9, which may be supplied with a terminal box 10, and connecting devices 11 whereby electrical current may be taken from whatever may be the situation of the buoy 9. Again, another conducting cable 12 may lead beneath the water from float 1 to a reel 13, carried by a movable float 14. It is thought to be apparent that the float 14 may be located at various points either near the central float 1 or as far therefrom as the length of cable 12 when unreeled its full length. The float 14 bears the adjustable electrode supports, comprising the vertically movable staff 15 guided in the upper sleeve 16 and lower sleeve 17, and the horizontally movable rod 18 guided in the bracket sleeve 19 secured at the bottom of the staff 15. It will be observed in Fig. 3 that the staff 15 is pierced transversely at intervals with holes for pins 20, by means of which the staff is supported in a higher or lower position as may be desired. In the same Fig. 3 it will also be noted that the horizontal rod 18 is threaded, and the threads engage the collar 21 held in a recess 22 in the bracket sleeve 19. The collar 21 has a projecting series of sprocket teeth 23 and may be rotated by chain 24 that passes around an upper sprocket wheel 25 on the staff 15 and provided with the crank handle 26. It is believed to be now clear that the collar when rotated operates to extend or to withdraw the horizontal rod 18 with respect to the vertical staff, and the electrode 27 at the outer end of the horizontal rod is correspondingly moved. Further considering Fig. 3 it will be seen that the electrode has a pivotal connection with the rod 18, the pivotal point being above the axial line of the electrode. Therefore, the outward face of the electrode is normally vertical and held in that position by the preponderance of weight below the line joining the pivotal points. In this position, the electrode may be directly presented to any vertical surface as the side of a ship just below the water line, as illustrated in Fig. 1. The insulating fenders 28 and 29 prevent actual contact between the electrode and the plates of the vessel. But, when the electrode is lowered in order to reach lower and curving portions of the ship's exterior, the outer face of the electrode will become inclined upon contact with the plates and assume a position directly presenting its full face to the surface even where curved, as also illustrated in Fig. 1. More than one electrode and adjustable supporting devices as described may be carried by the movable float 14, as illustrated in Fig. 2. From the central or main float or station 1 still another cable 30 may lead to a wheeled carriage 31, and this carriage may also have a reel 32 to take up and to let out the cable. The carriage is adapted to be moved from place to place on a wharf, and thus render the electrode and electrode supports with which it is equipped available for cleansing the bottom of vessels laid up at the wharf.

It is not essential that the movable float should be constantly connected by cable with the central float 1. Let it be assumed that the cable 12 is absent, and that the float 14 is provided with a short cable 33 by means of which it may be connected with the terminal boxes 6 and 10 of the stationary post and buoy already mentioned. Current may clearly be obtained in this manner for the purpose desired.

Whether there be considered either the central float 1 or the movable and detachable float 14, or the wharf carriage 31, the operation is the same. Each cable is constructed and arranged as is the cable 12. That is to say, one conductor 34 of the cable is connected with the electrode, and the other conductor 35 is connected with the metal exterior of the ship 36. Thus, when current is applied the ship's plates are one pole and the electrode the other pole of the electrolytic couple immersed in the sea water. Decomposition coats the plates with caustic soda formed immediately next the metal surface of the plate and the cleansing operation is effected thereby and all sea growths detached or loosened and eventually detached, and subsequent corrosion of the plates prevented.

Having now described my invention and explained the mode of its operation, what I claim and desire to protect by Letters Patent of the United States is—

1. In a ship-cleaner, the combination with a source of electricity, of a body movable independently of the ship to be cleaned, an electrode connected with and adapted to be supported in the water by the said body, and conductors leading from the source of electricity to the said body, one of the conductors being connected with the electrode, and another conductor arranged to be connected with the metal exterior of a ship.

2. In a ship-cleaner, the combination with a source of electricity, of a body movable independently of the ship to be cleaned, an electrode, electrode supports carried by the said body and constructed to support the electrode in the water and move the electrode toward or from the body, and conductors leading from the source of electricity to the said body, one of the conductors being connected with the electrode, and another conductor arranged to be connected with the metal exterior of a ship.

3. In a ship-cleaner, the combination with a source of electricity, of a floating body movable independently of the ship to be cleaned, an electrode connected with and adapted to be supported in the water by the said body, and conductors leading from the source of electricity to the said body, one of the conductors being connected with the electrode, and another conductor arranged to be connected with the metal exterior of a ship.

4. In a ship-cleaner, the combination with a source of electricity, of a floating body movable independently of the ship to be cleaned, an electrode, electrode supports carried by the said body and constructed to support the electrode in the water and move the electrode toward or from the body, and conductors leading from the source of electricity to the said body, one of the conductors being connected with the electrode, and another conductor arranged to be connected with the metal exterior of a ship.

5. In a ship-cleaner, the combination with a source of electricity, of an electrode, adjustable electrode supports constructed to support the electrode in the water and move the electrode toward or from the said supports, and conductors leading from the source of electricity to the said body, one of the conductors being connected with the electrode, and another conductor arranged to be connected with the metal exterior of a ship.

6. In a ship cleaner, the combination with a body movable independently of the ship to be cleaned, of a source of electricity carried by the said body, an electrode connected with and adapted to be supported in the water by the said body, and conductors leading from the source of electricity, one of the conductors being connected with the electrode, and another conductor arranged to be connected with the metal exterior of a ship.

7. In a ship-cleaner, the combination with adjustable electrode supports constructed to support an electrode in the water and move the electrode toward or from the said supports, of an electrode having a flat side, the said electrode being pivotally connected with the said supports substantially as described whereby the flat side of the electrode may be presented to the curving portions of a ship's bottom.

In testimony whereof I affix my signature in presence of two witnesses.

GEORGE W. FRAZIER.

Witnesses:
    JOHN F. BOYD,
    J. B. WALKER.